Dec. 27, 1955        R. J. ROBERTS        2,728,722
DEVICES FOR THE PURIFICATION OF REFINED PETROLEUM OILS
Filed Aug. 4, 1952                               2 Sheets-Sheet 1
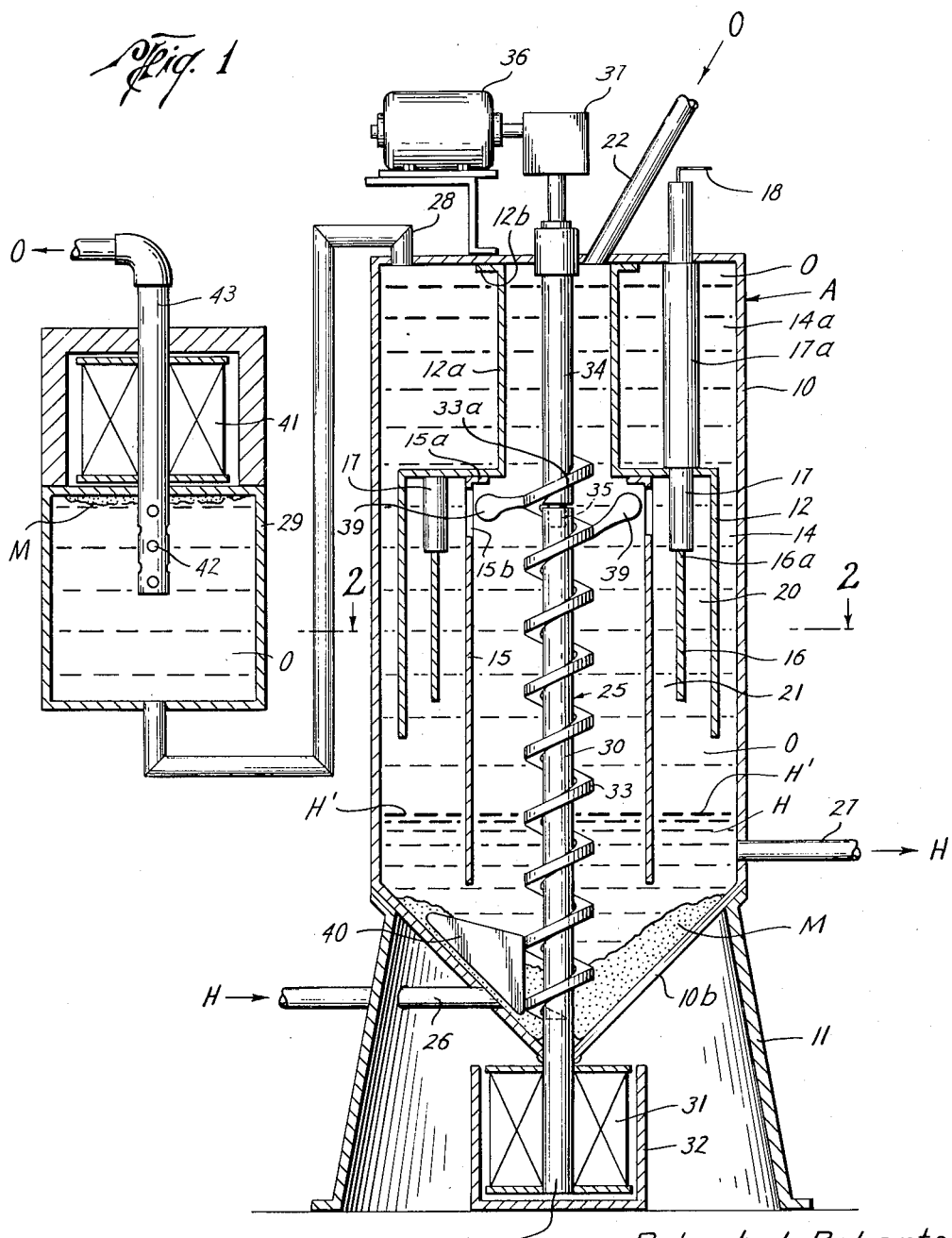
Robert J. Roberts
INVENTOR.
BY
ATTORNEYS Dec. 27, 1955  R. J. ROBERTS  2,728,722
DEVICES FOR THE PURIFICATION OF REFINED PETROLEUM OILS
Filed Aug. 4, 1952  2 Sheets-Sheet 2
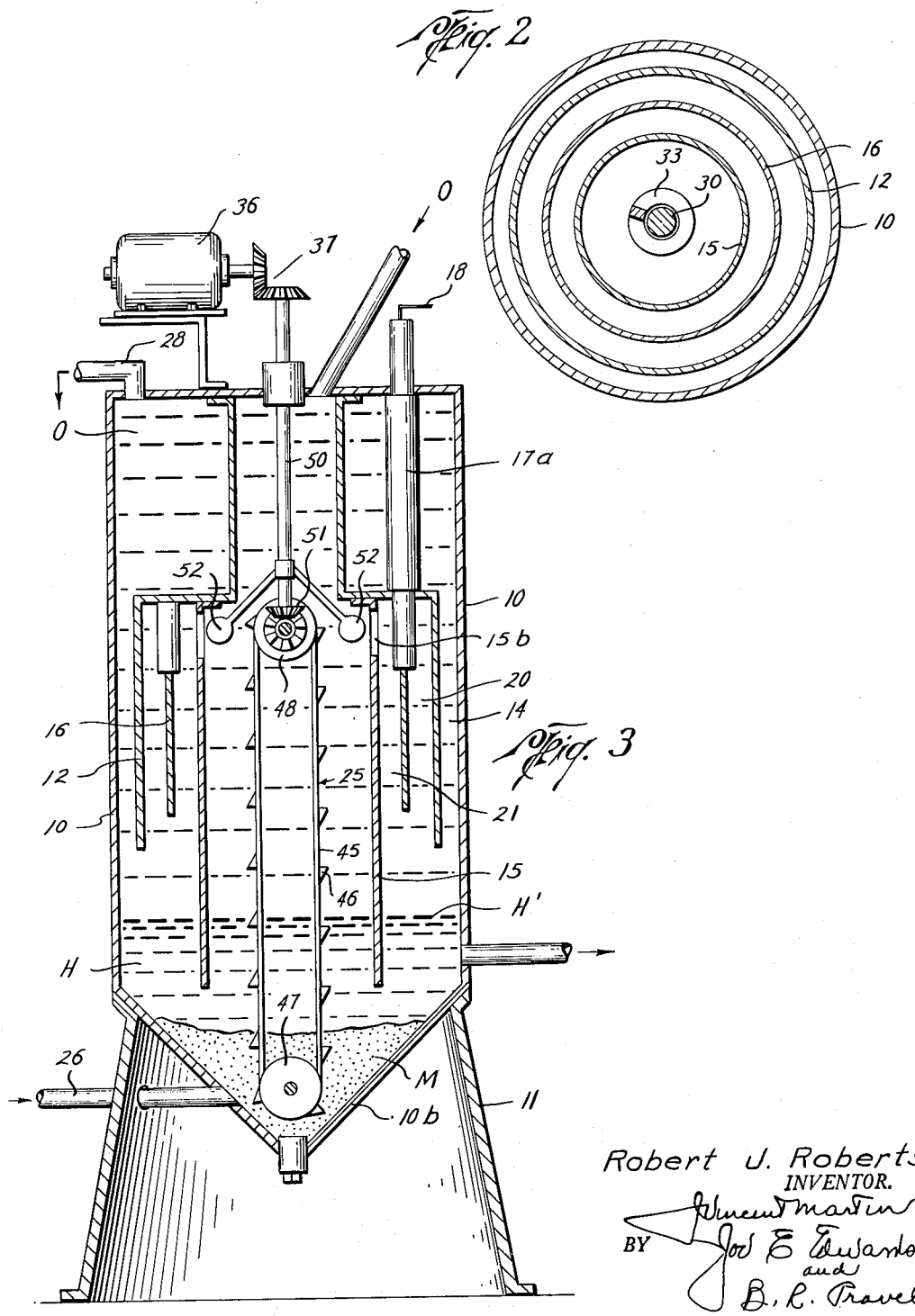
Robert J. Roberts
INVENTOR.
ATTORNEYS

United States Patent Office 2,728,722
Patented Dec. 27, 1955

2,728,722

DEVICES FOR THE PURIFICATION OF REFINED PETROLEUM OILS

Robert J. Roberts, Houston, Tex., assignor to Howe-Baker Company, Houston, Tex., a partnership Application August 4, 1952, Serial No. 302,526

6 Claims. (Cl. 204—307)

This invention relates to new and useful improvements in devices for the purification of refined petroleum oils.

In petroleum refining practice, substantially all of the products of distillation must be subjected to some type of treatment for the removal of impurities which impair the value of the product. Several methods of removing these impurities are well known to those skilled in the art and certain of these methods include the addition of strong acids which react with the impurities in the product to dissolve them therefrom; other methods include the addition of alkaline or other substances which likewise react with or remove the impurities in the product. In still other methods, the addition of acid is followed by the addition of alkalies for the purpose of neutralizing the acid which is left in the product. Regardless of the method employed and irrespective of the particular reagents which have been heretofore used to accomplish purification, great difficulty is experienced in completely removing the final traces of the reacted substance and reagent from the oil or product.

Attempts have been made to clarify refined oils which still contain small quantities of the undesirable substances by exposing the oil containing these fine suspensions to the action of a high voltage direct current electric field; however, the action of these fields is very slow and in those cases where the dispersed material is in extremely fine drops, the removal thereof is practically impossible.

A method for the removal of the final traces of the reacted substances in refined petroleum oils has been set forth in my copending U. S. application, Serial No. 241,219, filed August 10, 1951, now abandoned.

The present invention has for its principal object the provision of an apparatus for the removal of the final traces of the reacted product and the reagent which remains after the refined oils have been subjected to a purification step.

An important object of this invention is to provide an apparatus which includes a means for circulating finely divided solids in a high voltage direct current field wherein the refined oil to be clarified is also circulated.

Another object of this invention is to provide an apparatus including a chamber with a high voltage direct current field therein, means for circulating finely divided solid material in said field wherein refined oil to be clarified is also circulated for the separation of impurities from said oil, and means for removing the separated impurities from said chamber.

A further object of this invention is to provide a means including a magnetized member for conveying magnetic materials in either a vertical or a horizontal direction for various purposes such as the separation of ferrous from non-ferrous materials, the filtering of ferrous materials from liquids, and the distribution of ferrous materials in the catalytic removal of impurities from refined oils.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a vertical view, partly in section and partly in elevation, of the apparatus of this invention, illustrating particularly a form of the apparatus wherein magnetic particles are circulated within the treating vessel.

Figure 2 is a horizontal sectional view taken on line 2—2 of Figure 1, and illustrates the concentricity of the spaced cylindrical electrodes within the vessel.

Figure 3 is a view similar to Figure 1, but illustrates a different form of conveying means within the treating vessel.

In the drawings, the numeral A designates generally the apparatus of this invention in which the method described and claimed in my copending application, above-identified, or any other similar method, may be carried out. This apparatus includes a treating vessel 10 which is cylindrical and has a downwardly tapered conical bottom or lower portion 10b. The vessel 10 is preferably mounted upon an outwardly and downwardly flared support 11 which is disposed upon the ground or a suitable platform. Mounted within the vessel 10 is a cylindrical outer ground electrode 12 which has a reduced cylindrical portion 12a at its upper end which has connection with the top of the vessel 10 at 12b. This outer cylindrical electrode 12 is separated from the vessel 10 at all other points except the connection 12b and therefore forms an annular space 14 therebetween, which space 14 is of greater area in its upper portion 14a due to the reduced diameter section 12a of the outer electrode 12. Mounted concentrically within the outer electrode 12 is a cylindrical inner ground electrode 15 which has suitable connection with the outer electrode 12 at its upper end 15a.

Between the outer electrode 12 and the inner electrode 15, there is mounted in concentric relationship thereto, a positive electrode 16 which is supported from the outer electrode 12 by a plurality of spaced insulators 17. One of these insulators 17 has a wire 18 leading therethrough from the upper end 16a of the positive electrode 16 through a second insulating portion 17a, which electrical wire 18 has connection with a direct current voltage source, which is preferably capable of supplying a high voltage in the neighborhood of 5,000 volts per inch. It will be understood that the voltage source, not shown, will have one end connected to the terminal wire 18 of the positive electrode 16 while the other end will be connected to ground so that a complete circuit will be established between the positive electrode 16 and the inner ground electrode 15 and the outer ground electrode 12. Since the outer ground electrode and the positive electrode 16 have a space 20 therebetween, an electrical field is established in such annular space 20. Similarly an electrical field is established in the annular space 21 between the inner ground electrode 15 and the positive electrode 16.

At the upper end of the vessel 10 an inlet pipe 22 is provided for the admission of a liquid such as the refined petroleum oil or distillation product which has previously been purified, but which has therein finely suspended impurities such as the reacted products from the previous purification procedure. This inlet 22 has communication with the reduced cylindrical portion 12a whereby the liquid is carried downwardly therethrough and passes into the electrical field in the annular spaces 20 and 21 by passing through the spaced circumferential openings 15b in the upper end of the inner cylindrical electrode 15 and also through the spaces between the insulators 17 which are positioned above the positive electrode 16. It will be observed that the inner electrode 15 is substantially longer than the outer electrode 12, with the inner electrode 15 extending downwardly to a point below the level H prime of a non-miscible liquid H, the purpose of which will be described hereinafter.

At the lower end of the vessel 10, within the downwardly tapered conical portion 10b, there is disposed finely divided solid material which is adapted to be raised upwardly in the vessel 10 by a conveyor means 25 for circulation in the electrical field within the annular spaces 20 and 21. This material M may take many forms depending upon the particular process involved. If the clarification process is to be carried out as set forth in my above-identified application, such particles of solid material M may be metallic and may consist of finely divided iron, copper, magnesium, nickel, or other pure metallic substances. On the other hand, the particles of the solid material may be mineral, such as iron oxide, copper oxide, copper chloride, finely divided clays, silica, or other solid insoluble substances which will not dissolve in water or in oil to any appreciable extent. This solid material M when it is carried upwardly by the conveyor means 25 into the electric field where the oil or other liquid O is being circulated, serves to attract and agglomerate the impurities in the liquid O and thereafter the impurities are carried downwardly through the liquid O by gravity to the bottom of the vessel 10. To remove the impurities from the solid material M the liquid H which is non-miscible with the liquid O is circulated slowly through the bottom of the vessel 10, being admitted at the inlet 26 in the vicinity of the lower end of the conical portion 10b and being discharged at outlet 27 above the conical portion 10b and above the accumulated solid material M in the bottom thereof. The slowly moving water or other non-miscible liquid H serves to clean the solid material M so that it can be recirculated and perform its function within the electric field a number of times. The purified oil passes upwardly around the outside of the cylindrical outer electrode 12 and into the annular space 14a where it is discharged through an outlet 28 for passage to a separation unit 29 which removes any entrained material M which may have passed over with the oil O.

Referring now to Figure 1 particularly, therein is shown a form of this device in which the solid material M is a magnetic material such as iron, iron oxide, iron pentacarbonyl, nickel or nickel oxide. The conveyor 25 in Figure 1 is especially constructed to handle the conveyance of magnetic particles. The conveyor means 25 of Figure 1 includes a core or rod 30 which extends longitudinally within the vessel 10. The lower end of the core 30 projects through a sealed opening in the bottom of the vessel 10 and has such lower end 30a surrounded by a magnetizing coil 31, which coil 31 is suitably disposed within a housing 32 and has electrical leads (not shown) to a direct current voltage source. It will be appreciated that such electric coils as the one illustrated at 31 in Figure 1 are well known and serve to magnetize the magnetic core or rod 30 extending therethrough.

Mounted on the outside and surrounding the core or rod 30 is a helical member or screw 33 which is disposed within the vessel 10 and is not connected to the rod 30 whereby the screw 33 and the rod 30 may be rotated relative to each other. Normally the core or rod 30 is held stationary in the vessel 10 and the screw 33 is rotated. This rotation is accomplished by connecting the upper end of the screw 33 at its indicated point 33a to a shaft 34 which like the screw 33 is of non-magnetic material. The shaft 34 forms a continuation of the rod 30 but relative rotational movement of these two parts is permitted by reason of a bearing connection 35 which may take the form of a pin extending within a box in the upper end of the rod 30. Rotational movement of the shaft 34 and the screw 33 is imparted by a drive means such as the electric motor 36 which drives through a suitable gearing arrangement 37 whereby relative rotational movement is imparted to the screw 33 with respect to the stationary core or rod 30. Since the core 30 is magnetized by reason of the coil 31, the magnetic material M in the lower portion 10b of the vessel 10 is attracted to the core 30 and is thereafter moved longitudinally with respect to the core 30 by reason of the rotation of the helical member or screw 33. When the magnetic material reaches the non-magnetic shaft, it will be appreciated that the holding effect of the core 30 will be released so that the magnetic particles will be free to fall from the screw 33 at its upper portion near the end 33a connected to the shaft 34.

To assist in the distribution and circulation of the magnetic particles M when they are released at the upper end of the screw 33, there is provided an agitator means such as the paddles 39 which are preferably disposed on the exterior circumferential surface of the screw 33 near its upper end in proximity to the openings 15b of the inner ground electrode 15. These paddles 39 thus serve to distribute the magnetic material M into the electric field in the annular spaces 20 and 21 where they serve the purpose of attracting and agglomerating the undesirable impurities in the refined oil O while the oil is being subjected to the electric field. As will be appreciated the magnetic particles and the accumulated impurities then fall by gravity through the oil and enter into the liquid H such as water and fall to the bottom 10b of the vessel 10. The water H serves to clean the impurities from the magnetic material M and cause them to float or separate in an upward direction away from the accumulated magnetic material. Additionally a paddle or paddles 40 may be provided on the lower end of the screw 33 to agitate the magnetic material M to some extent in order to provide the cleaning action of the liquid H as well as to encourage the magnetic material to accumulate in the apex of the conical portion 10b of the vessel.

As was previously pointed out some of the magnetic material M may travel over with the oil to the outlet 28 and must thereafter be separated from the oil O in the separator 29. This separator 29 may take the form shown in Figure 1 when the material M is magnetic since the particular construction shown in Figure 1 includes an electric coil 41 which is similar to the electric coil 31 used for magnetizing the rod 30. In the final separator 29 the coil serves to attract the magnetic particles in the conventional manner and permits the flow of oil through the openings 42 in the discharge pipe 43 of the final separation unit 29. It will be appreciated that any conventional separator could be used in place of the construction illustrated in Figure 1 and designated by the numeral 29.

The operation of the device of Figure 1 is believed evident from the foregoing description. To summarize the operation, it should be pointed out that the oil or other refined distillation product or any other liquid which is to be treated in an electric field employing a solid finely divided material therewith, is fed into the vessel 10 through the inlet 22 and carried downwardly through the reduced cylindrical section 12a for circulation within the electric field established in the annular spaces 20 and 21. As was previously pointed out the inner ground electrode 15 has openings 15b therein near the top of the electrode 15 and at spaced points so that the oil O or other liquid may pass freely therethrough to enter the space 21. Similarly openings will be present above the electrode 16 since it is supported by spaced insulators 17 and this provides for the circulation of the oil through the annular space 20 also. While the oil or other liquid O is being circulated within the electric field, the magnetic material M is lifted longitudinally by its attraction to the core 30 and the rotational movement of the screw 33 relative thereto to distribute such magnetic material at the upper end of the ground electrode 15 on the inside thereof. Thus, the magnetic material flows into the electric field in the annular spaces 20 and 21 as the oil or other liquid O is passing therethrough. It is in this electric field that the agglomeration of the impurities referred to above is obtained and due to the weight of the agglomerated impurities in connection with the magnetic material M they fall to the bottom of the vessel 10 while the oil which has been clarified or further purified passes upwardly around the outer electrode 12 and into the annular space 14 and thence upwardly into the enlarged annular portion 14a for discharge through the outlet 28 from the vessel 10. The oil is then passed to a final separator 29 if desired to remove any entrained magnetic particles which may be present in the refined and clarified oil or other liquid O.

At the lower end of the vessel 10 a liquid level H prime is maintained by the flow of a liquid H which is non-miscible with the oil O, such liquid H preferably being water. This liquid H serves to clean the foreign impurities which have collected on the magnetic material and remove them therefrom and carry them out through the liquid discharge 27. It will be observed that the lower ends of the inner electrodes 15 are below the level H prime of the liquid H and also below the outlet 27 to serve as a separator between the magnetic material M passing upwardly on the conveyor 25 and the agglomerated impurities and the magnetic material M falling downwardly by gravity after being circulated through the electric field. It should be particularly pointed out that the flow of the liquid H through the vessel 10 is very slow so that there is not a great agitation or mixing between the oil and the liquid H at the interface H prime therebetween.

In Figure 3, the device is shown in a different form, wherein all parts are the same except for the conveyor means 25 as compared to Figure 1. The form shown in Figure 3 is particularly adapted to handle non-magnetic materials M, although it will be appreciated that it could also handle magnetic materials. In this form of the invention, the conveyor means 25 includes an endless belt 45 which has thereon at spaced intervals buckets 46 of the conventional type. The endless belt is mounted upon suitable rollers or wheels 47 at its lower end and 48 at its upper end. The lower wheel 47 is disposed within the lower portion 10b of the vessel 10 and within the accumulated material M therein, whereby upon the movement of the endless belt the buckets 46 pick up the material M and carry it upwardly to the upper end of the conveyor in proximity to the upper wheel 48 at which point the buckets are turned up side down and the open end is downward so that the material M is released from the conveyor 25. The conveyor 25 is operated by a drive motor 36 and the suitable gearing arrangement 37 which is preferably a pair of right-angle bevel gears which serve to drive a shaft 50 and through rotation of such shaft 50, and the gearing arrangement of the right-angle bevel gears 51 the upper wheel 48 is also rotated to drive the endless belt 45. To distribute the material M as it is released from the buckets 46 upon their being turned downwardly, paddles 52 are preferably provided and have a fixed connection to the shaft 50 for rotation therewith.

The operation of the device of Figure 3 is the same as that of Figure 1 except for the operation of the conveyor 25 shown therein, which is believed evident from the foregoing description. Thus, as the conveyor belt 45 moves in its endess path by the drive wheel 48 rotating, the buckets 46 pick up the material M from the lower conical portion 10b of the vessel 10 where it has accumulated and are carried upwardly into the vicinity of the spaced openings 15b in the ground electrode 15 where such material M is released by the buckets turning over with the open end downwardly in succession as they pass over the upper wheel 48. The paddles 52 thereafter serve to enhance the distribution and circulation of the material M within the electric fields in the annular spaces 20 and 21. Since the material M as used in the form shown in Figure 3 may not necessarily be magnetic, the outlet 28 from the vessel 10 may feed the oil or other liquid O to any suitable type of filtering device for the removal of any of the powdered or finely divided material M which is carried over with the treated oil O.

Although many modifications will occur to those skilled in the art and such modifications are within the scope of this invention, it should be particularly pointed out that the magnetic conveyor 25 shown in Figure 1 has many uses other than in the particular treating vessel 10 illustrated therein. For example, the magnetic conveyor of Figure 1 could be used in any place that it was desired to transport or convey magnetic materials over a considerable distance either vertically or horizontally. The conveyor 25 of Figure 1 could also be used for separating magnetic from non-magnetic materials or for the filtering of magnetic materials from a liquid. Additionally, although the device has been illustrated as having the core 30 stationary with the screw 33 rotating relative thereto, it will be appreciated that the core 30 could be rotated while the screw 33 was held stationary with the same relative rotational movement and the same longitudinal conveyance of the magnetic material M.

The foregoing disclosure and description of the invention is illustrative and explanatory thereof and various changes in the size, shape and materials, as well as in the details of the illustrated construction may be made, within the scope of the appended claims without departing from the spirit of the invention.

What is claimed is:

1. An apparatus for conveying magnetic material comprising, a stationary magnetized core, a non-magnetic helical screw disposed about said core, said magnetized core being exposed between the successive turns of said helical screw and drive means for imparting rotational movement to said screw whereby the magnetic material upon attraction to said core may be moved longitudinally thereof by said screw.

2. The apparatus set forth in claim 1, including a non-magnetic shaft interposed between said drive means and the adjacent end portion of said magnetized core, said nonmagnetic shaft having rotating bearing support within said end portion of said magnetized core and being connected to one end of said screw for connection with said dirve means, whereby the magnetic material will be released from the action of the screw upon contact with said non-magnetic shaft.

3. An apparatus for the treatment of refined oils for the removal of finely suspended impurities therefrom comprising, a treating chamber having means in the lower portion thereof for accumulating finely divided solid material, spaced electrodes in said chamber above the accumulating means for providing a high voltage direct current field therein, a conveyor disposed in and on the longitudinal axis of said chamber for moving the finely divided solid material from the lower portion of the chamber to the electrodes, said conveyor comprising a magnetized core having a non-magnetic helical screw disposed thereabout said magnetized core being exposed between the successive turns of said helical screw, said screw having relative rotational movement with respect to said core.

4. An apparatus for the separation of finely suspended impurities from products of distillation comprising, a treating vessel having an inlet for the distillation product and an outlet therefor, spaced inner and outer annular electrodes within the vessel between the inlet and outlet whereby the product is circulated through the electric field which is established between the electrodes, a supply of finely divided magnetic material within the lower portion of the vessel, an axially extending magnetized shaft within the vessel and having a portion thereof disposed within the inner annular electrode and adapted to attract and hold the finely divided material on its surface by magnetic attraction, and a rotatable screw of non-magnetic material surrounding the shaft and extending from the lower portion of the vessel to the upper portion thereof and functioning to move the material adhering to the shaft upwardly along said shaft when the screw is rotated.

5. An apparatus as set forth in claim 4, wherein the magnetized shaft terminates short of the upper end of the screw, whereby the screw moves the material past the upper end of the shaft and thereby releases said material from the magnetic attraction of the shaft, thereby permitting the material to fall downwardly by gravity within the vessel.

6. An apparatus as set forth in claim 4, wherein the magnetized shaft terminates short of the upper end of the screw, whereby the screw moves the material past the upper end of the shaft and thereby releases said material from the magnetic attraction of the shaft, thereby permitting the material to fall downwardly by gravity within the vessel, an agitator secured to the lower end of the screw and movable through the material in the lower portion of the vessel when the screw is rotated, and a paddle element at the upper end of the screw and rotatable therewith for agitating the material being discharged from the shaft to distribute throughout the area surrounding the shaft.

References Cited in the file of this patent

UNITED STATES PATENTS

| | | |
|---|---|---|
| 821,752 | Shaw | May 29, 1906 |
| 1,773,646 | Skov | Aug. 19, 1930 |
| 1,827,714 | Morrell | Oct. 13, 1931 |
| 2,030,198 | Cerf | Feb. 11, 1936 |
| 2,045,465 | Hassler | June 23, 1936 |
| 2,629,482 | De Back | Feb. 24, 1953 |